Dec. 25, 1962 K. HILGERS 3,069,917
ARRANGEMENT FOR THE TRANSPORT OF BLANKS IN MACHINE TOOLS
Filed May 13, 1960 2 Sheets-Sheet 1

INVENTOR:
KARL HILGERS

BY

Michael S. Striker
his ATTORNEY

INVENTOR:
KARL HILGERS
BY his ATTORNEY

United States Patent Office 3,069,917
Patented Dec. 25, 1962

3,069,917
ARRANGEMENT FOR THE TRANSPORT OF BLANKS IN MACHINE TOOLS
Karl Hilgers, Dusseldorf, Germany, assignor to Malmedie & Co. Maschinenfabrik G.m.b.H., Dusseldorf, Germany
Filed May 13, 1960, Ser. No. 28,926
Claims priority, application Germany May 15, 1959
5 Claims. (Cl. 74—109)

The present invention relates to an arrangement for the transport of blanks in machine tools, and more particularly to an arrangement which is utilized for rotation of nuts and similar blanks simultaneously with the transfer of blanks between a series of aligned processing stations.

In the manufacture of nuts in cold upsetting presses, the holding members which transfer the nut blanks between the adjacent dies must turn the blanks through 180 degrees, such turning movement being carried out simultaneously with the transfer of blanks between the adjacent dies. If the automatic operation of such machine tools is to be carried out with little waste in time, the transfer and simultaneous turning of blanks must be effected very rapidly, and it is further desirable that the means which supports the holding members as well as the holding members themselves be of lightweight design in order to reduce the inertia of masses during rapid transfer of the blanks. The transporting arrangements of presently known design do not meet such requirements.

For example, it is already known to mount the blank holding members on a carriage which is formed with dovetailed guides slidably received in a bed supported by the die holding means. The blank holders, preferably assuming the form of spring-biased grippers, are eccentrically mounted for rotation about vertical axes and are rotated by a rack-and-pinion assembly whenever the carriage is shifted with respect to the bed. Such construction is not entirely satisfactory because, owing to eccentric mounting of the blank holding members and particularly of their grippers, the latter tend to continue their rotary movement when the supporting carriage is arrested and, therefore, the blanks are not in proper position with respect to the dies. In addition, the holding members tend to revolve about their eccentric axes of rotation when the stripping tools remove the blanks from their grippers.

An important object of the present invention is to provide a transporting arrangement which is capable of advancing a blank between two adjacent dies and which simultaneously turns the blank through a required angle, the arrangement being such that the blank holding member or members, the support means therefor, and all other components are of lightweight design which reduces the inertia when the blanks are rapidly transferred between the adjacent processing stations.

Another important object of the invention is to provide an arrangement of the just outlined characteristics which is constructed and assembled in such a way that the blank holding members are caused to rotate about their own axes to thereby reduce the stresses to which the moving parts and their supports are subjected in actual operation and to prevent any turning of holding members during removal of the blanks.

A further object of the invention is to provide an arrangement of the above described type which is constucted and assembled in such a way that the tools which act upon the blanks at the various treating or processing stations may be of smaller dimensions and that the tools may be placed into very close proximity of mating dies at the respective stations.

With the above objects in view, the invention resides in the provision of a transporting arrangement which comprises essentially a support mounting at least one but preferably more holding members provided with suitable grippers which releasably hold a blank therebetween, the holding members being mounted for rotation about their vertical axes and preferably rotating in clockwise direction during each transfer of blanks to the next processing stations, carrier means which mounts the support and is mounted for swinging movements about one or more vertical axes, cooperating actuating and actuated members mounted on the carrier means and on the holding members, and means for reciprocating the support with the holding members between two spaced positions, the arrangement being such that the cooperating actuating and actuated members automatically turn the holding members when the support is moved between said spaced positions. It is preferred to mount the support on a carrier means consisting of several arms so that the support is swingable with respect to the arms, and the means for moving the support preferably comprises a universal joint and a push rod which may reciprocate the support in two opposing directions, the holding members transferring blanks from one to another processing station during each movement of the support in one direction, and returning empty into their respective starting positions when the support is moved in the other direction.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figure 1:
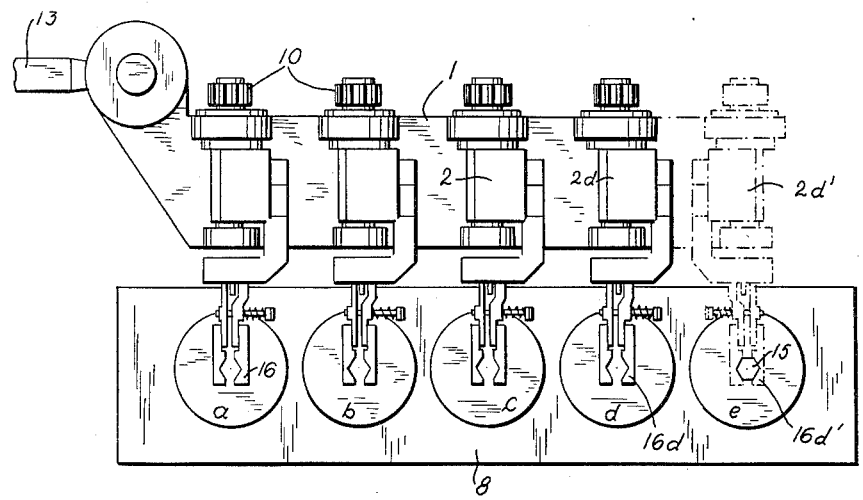
FIG. 1 is a schematic front elevational view of the transporting arrangement embodying my invention with the carrier means for the support omitted.

Referring now in greater detail to the illustrated embodiment, there is shown a transport arrangement comprising a support 1 which rotatably mounts four holding members 2. Each holding member is mounted for rotation about its own vertical axis which coincides with the rotational axis of an actuated means or gear 10 mounted at its upper end. The support 1 is swingably mounted on two parallel arm-like carriers 3, and the carriers are rockably mounted on the die block 8. As is best shown in FIG. 3, the die block 8 supports a column 9 which mounts two vertical shafts 7, one for each carrier 3, only one such shaft being shown in FIG. 3. The carriers 3 are mounted in antifriction bearings 6 and are pivotable about the vertical axes of their respective shafts 7 between the full line positions of FIG. 2 and the positions 3' which are indicated in phantom lines. It will be noted that, while moving between their end positions, the carriers 3 describe angles not substantially exceeding and preferably less than 90 degrees. The forward ends of carriers 3 mount vertical pivot axles 5 which connect the same with the support 1, the latter being rockable about antifriction bearings 4. The means for moving the support and the carriers with respect to the axes of fixed vertical shafts 7 comprises a push rod 13 and an universal joint here shown as a spherical joint 12, best seen in FIG. 2. The push rod 13 is reciprocable in directions indicated by the double arrow 14 and brings about a composite movement of the support 1 which consists of a movement in parallelism with itself in one of the directions indicated by the arrow 14 and of simultaneous pivotal movement about the shafts 7. The push rod 13 may be reciprocated by the non-illustrated carriage which moves the upsetting tools toward and away from the dies.

Figure 2:
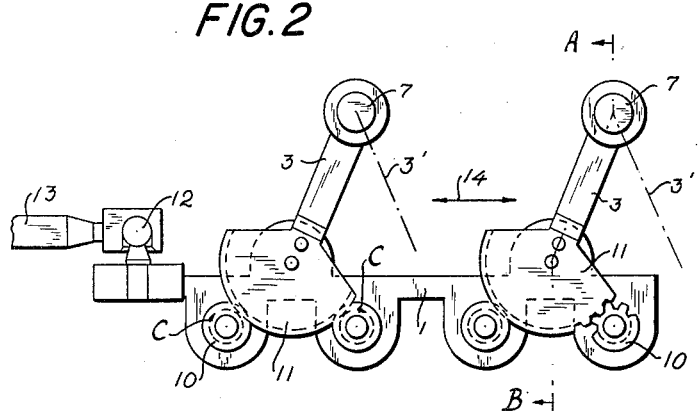
FIG. 2 is a schematic top plan view of the arrangement shown in FIG. 1, with the carrier means shown but with the die block omitted.
Figure 3:
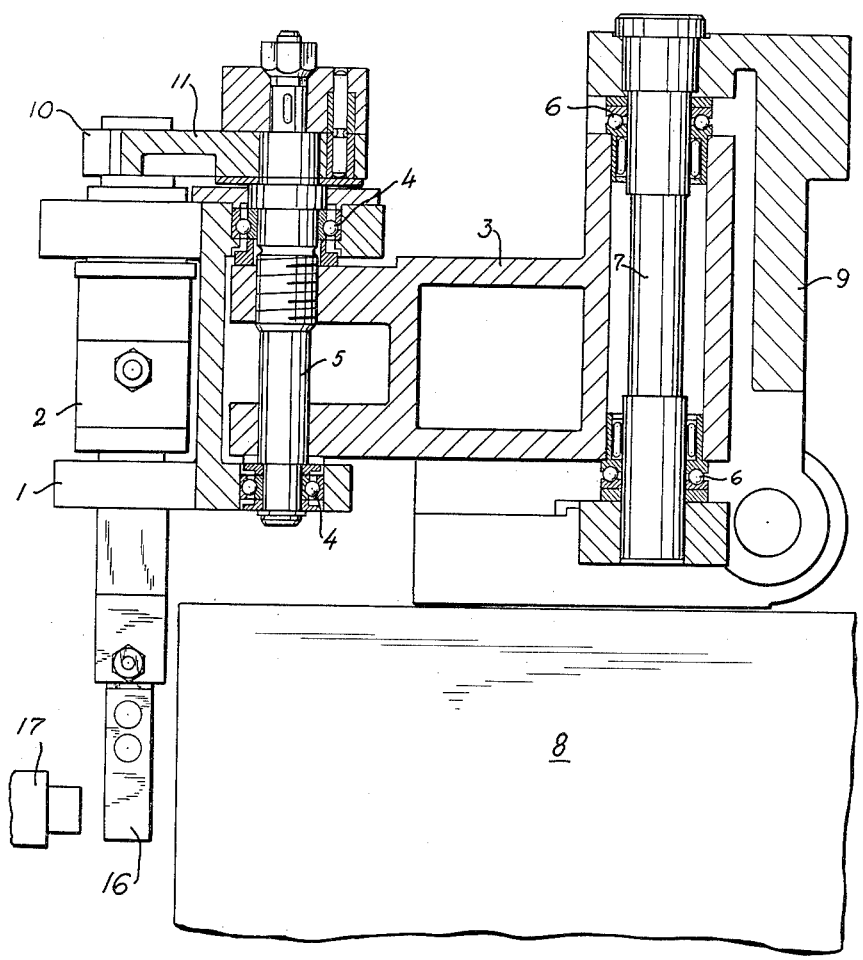
FIG. 3 is an enlarged vertical section taken substantially along the line A—A of FIG. 2, as seen in the direction of arrows.

As clearly shown in FIG. 2, the axes of the shafts 7 and the axes of the gears 10 (and hence of the holders 2) are disposed in parallel vertical planes and the carriers 3 are perpendicular to these planes when moved midway between their end positions. This insures that the support 1 is moved only slightly away from the die block 8 during rocking movements of the carriers particularly since the angular distance between the end positions of the carriers does not substantially exceed 90 degrees.

The carriers 3 support actuating means in the form of toothed segments 11 each of which meshes with two gears 10, the diameters of the segments 11 and of the gears 10 being selected in such a way that the holding members 2 are inverted or turned through exactly 180 degrees whenever the carriers 3 are pivoted about the shafts 7 between their full-line and phantom line positions of FIG. 2.

The block 8 mounts five uniformly spaced dies $a$, $b$, $c$, $d$, $e$, which are adjacent to the grippers 16 coaxially mounted at the lower ends of respective holding member 2. When the support 1 is moved by its push rod 13 in a direction to the right of FIG. 1, the right-hand holding member $2d$ for example is turned through 180 degrees and then assumes the broken-line position $2d'$ in front of the die $e$ to move a blank 15 into proper position with respect to said die. During such movement of the right-hand holding member $2d$ the other holding members are respectively caused to advance from the die $a$ to the die $b$, from the die $b$ to the die $c$, and from the die $c$ to the die $d$, and are simultaneously turned through 180 degrees owing to permanent mesh of the gears 10 with the toothed segments 11. The dies are provided with suitable ejector means, not shown, which automatically move the blanks between the spring-biased grippers 16 of the respective holding members before the holding members are caused to turn in clockwise directions indicated by the arrows C in FIG. 2. As is shown in the right-hand half of FIG. 1, the grippers $16d$ of the right-hand holding member $2d$ are turned through 180 degrees and assume the position $16d'$ when this holding member advances from the full-line position in front of the die $d$ into the broken-line position $2d'$ in front of the die $e$.

Referring now to FIG. 3, it will be noted that the stripping tool 17 which expels the blank 15 from the respective grippers 16 is located very close to the die block. This is made possible because the holding members 2 are caused to rotate about their vertical axes and, therefore, the grippers 16 are always rather close to the dies $a$–$e$. The actual upsetting tool is not shown in the drawings; this upsetting tool passes through the stripping tool 17 when its non-illustrated carriage is moved toward the die block 8. As mentioned hereinabove, the movements of the carriage for the upsetting tools are preferably synchronized with movements of the push rod 13 and hence with movements of the support 1. An important advantage of the mounting of stripping tools 17 in close proximity of respective dies is that the machine tool may utilize much shorter upsetting tools and that the upsetting tools must cover shorter distances on their way into contact with the blanks so that the likelihood of buckling is practicaly non-existent. The swinging movements of the support 1 in parallalism with itself and about the vertical shafts 7 are rather small and the support is moved away from the die block 8 at a time when the holding members are midway between the adjacent dies. Thus, the swinging movements of the support 1 and of the holding member 2 about the shafts 7 do not interfere with the mounting of the stripping tools 17.

Because the grippers 16 of the holding members are coaxial with the gears 10, their inertia during rotation of gears 10 by the segments 11 is rather small so that each pair of grippers 16 may be immediately arrested in front of the respective dies after turning the blanks through exactly 180 degrees. In addition, the holding members may be of comparatively lightweight design and, owing to their mounting coaxially with the grippers 16, will not tend to turn when the stripping tools 17 expel the blanks 15 from the respective grippers 16.

As is shown in FIG. 2 by the arrows C, the holding members 2 preferably rotate in clockwise direction during the transfer of blanks from the dies $a$–$d$ to dies $b$–$e$, respectively. This is of particular advantage in the manufacture of nuts because the last holding member $2d$ advances the blank 15 in such a way that the side of this blank which was turned toward the die $d$ is turned toward the stripping tool 17 associated with the die $e$.

Of course, the support may be mounted on more than two carriers 3, and each carrier may be provided with a segment which meshes with a single gear, if desired. It is equally possible to replace the gears 10 and segments 11 by cooperating actuating and actuated means of different design, for example, by pulleys and endless belt drives or the like.

The feature that the gears 10 may be driven by toothed segments rather than by toothed racks results in considerable savings because the segments may constitute portions of ring gears whose manufacturing cost is much lower than that of toothed racks. Also, the construction and particularly the finish of the support 1 is less expensive because the support need not be formed with precision finished guide surfaces such as are necessary in conventional transport arrangements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention, and, therefore, such adaptations should and are intended to be comprehended within the meaning and range of equivalence of the following claims.

What is claimed as new and desired to be secured by Letters Patent is:

1. An arrangement for simultaneously transporting and inverting a plurality of blanks and like articles comprising, in combination, at least two parallel carriers each rockable about a vertical axis between a first and second position; a rigid support articulately connected to said carriers so as to move in parallelism with itself in response to rocking movements of said carriers about the respective axes; means including said support for rocking the carriers between said positions; a plurality of rotary blank holders mounted on said support; and motion transmitting means comprising actuating means connected with said carriers and actuated means connected with said holders for inverting said holders in response to rocking movements of the carriers between said first and second positions.

2. An arrangement for simultaneously transporting and inverting a plurality of blanks and like articles comprising, in combination, at least two parallel carriers each rockable about a vertical axis through angles not substantially exceeding 90 degrees between a first and a second position; a rigid support articulately connected to said carriers so as to move in parallelism with itself in response to rocking movements of said carriers about the respective axes; means including said support for rocking the carriers between said position; a plurality of rotary blank holders mounted on said support; and motion transmitting means comprising actuating means connected with said carriers and actuated means connected with said holders for inverting said holders in response to rocking movements of the carriers between said first and second positions.

3. An arrangement for simultaneously transporting and inverting a plurality of blanks and like articles comprising, in combination at least two parallel carriers each rockable about a vertical axis between a first and a second position; a rigid support articulately connected to said carriers so as to move in parallelism with itself in response to rocking movements of said carriers about the respective axes; means including said support for rocking the carriers between said positions; a plurality of rotary blank holders mounted on said support, at least two for each of said carriers; and motion transmitting means comprising a toothed segment connected with each of said carriers and a gear coaxially connected with each of said holders, each segment meshing with at least two of said gears and the transmission ratio between said segments and the respective gears being such that the gears turn the respective holders through 180 degrees when the carriers are rocked between said first and second positions.

4. An arrangement for simultaneously transporting and inverting a plurality of blanks and like articles comprising, in combination, at least two parallel carriers each rockable about a vertical axis between a first and a second position; a rigid support articulately connected to said carriers so as to move in parallelism with itself in response to rocking movements of said carriers about the respective axes; means including said support and comprising a push rod and a universal joint connecting the push rod with said support for rocking the carriers between said positions; a plurality of rotary blank holders mounted on said support and each rotatable about a vertical axis; and motion transmitting means comprising actuating means connected with said carriers and actuated means connected with said holders for inverting said holders in response to rocking movements of the carriers between said first and second positions.

5. An arrangement for simultaneously transporting and inverting a plurality of blanks and like articles comprising, in combination, at least two parallel carriers each rockable about a vertical axis between a first and a second position; a rigid support articulately connected to said carriers so as to move in parallelism with itself in response to rocking movements of said carriers about the respective axes; means including said support for rocking the carriers between said positions; a plurality of rotary blank holders mounted on said support and each rotatable about a vertical axis, said last named vertical axes located in a common plane parallel with the plane of said first named axes, said carriers substantially perpendicular to said planes when moved midway between said end positions thereof and the angular distance between said end positions not substantially exceeding 90 degrees; and motion transmitting means comprising actuating means connected with said carriers and actuated means connected with said holders for inverting said holders in response to rocking movements of the carriers between said first and second positions.

References Cited in the file of this patent

UNITED STATES PATENTS

| | | |
|---|---|---|
| 2,532,213 | Wilcox | Nov. 28, 1950 |
| 2,689,358 | De Loe | Sept. 21, 1954 |